Patented Dec. 8, 1953

2,662,063

UNITED STATES PATENT OFFICE 2,662,063

CATALYST COMPOSITION

Donald C. Christain and Robert M. Reed, Louisville, Ky., assignors, by mesne assignments, to National Cylinder Gas Company, Chicago, Ill., a corporation of Delaware No Drawing. Original application March 8, 1948, Serial No. 13,738. Divided and this application July 21, 1951, Serial No. 238,004

5 Claims. (Cl. 252—470)

This application is a division of our copending application Serial No. 13,738, filed March 8, 1948, now U. S. Patent No. 2,602,020, and assigned to the same assignee as the present invention.

This invention relates to a process for producing hydrogen and carbon dioxide by passing a mixture of gases containing carbon monoxide and water vapor over a catalyst at elevated temperatures, and to an improved catalyst for use in carrying out such process. More particularly, the invention is directed to an improvement in the step of initially increasing the temperature of the catalyst, and to a catalyst capable of withstanding the conditions incident to the initial heating without impairment of its physical or catalytic properties.

As is well known in the art, the production of hydrogen and carbon dioxide by the catalytic reaction or conversion of carbon monoxide and water vapor in a mixture of gases is carried out at elevated temperatures (e. g., 650° F. to 1000° F.) in order to accomplish the conversion at a commercially practicable rate. In practice, the mixture of gases containing carbon monoxide and steam or water vapor generally is preheated to substantially the desired reaction temperature prior to being passed in contact with the catalyst. In addition, the temperature of the catalyst is commonly increased substantially to the temperature at which the reaction is to be carried out before the gaseous reaction mixture containing carbon monoxide and water vapor is brought into contact with the catalyst. Because of the exothermic nature of the reaction

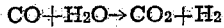

$$CO + H_2O \rightarrow CO_2 + H_2$$

the catalyst is readily maintained at the desired reaction temperature during the operation of the process. In fact, steam is commonly added to the gases during the course of the conversion for the purpose of cooling the gases and maintaining the reaction temperature within the desired range.

The method described above has long been open to the objection that a great deal of time and expense is involved in initially bringing the catalyst mass up to the temperatures essential in carrying out the reaction. The catalysts heretofore available for use in the conversion of carbon monoxide and water vapor to hydrogen and carbon dioxide have been characterized by an extremely poor resistance to liquid water, manifested by a tendency to disintegrate and impede the normal flow of gases after being subjected to moisture or liquid water such as would result from condensation of steam. Therefore it has been necessary to carry out the step of initially preheating the catalyst by the use of dry gases such as hydrogen or nitrogen to avoid condensation of steam or water vapor in the catalyst mass. In order to accomplish this preheating with dry gases it heretofore has been necessary to provide more or less elaborate auxiliary systems for circulating or recycling dry, inert, heated gases through the catalyst mass. These auxiliary systems, representing appreciable investment in piping, valves, heaters, and pumps, are idle during the normal operation of the process. Furthermore, since the entire heating of the catalyst mass must be accomplished by the sensible heat available in the dry gases, the preheating operation is necessarily time consuming. For example, from 24 to about 48 hours is commonly required to bring the catalyst up to the desired reaction temperature. It is obvious that the excessive time and expense involved in preheating the catalyst makes the above process impracticable for applications where frequent interruptions in the process are required.

Attempts have been made to expedite the step of initially raising the temperature of the catalyst by employing dry preheating gases at temperatures substantially above the reaction temperature at which the catalyst is intended to be used. However, such attempts have been generally unsuccessful because of the sensitivity to overheating of iron oxide catalysts of the more active type, which preferably are employed in the conversion of carbon monoxide and water vapor to hydrogen and carbon dioxide. For example, it has been found that the effectiveness of catalysts of this type is appreciably reduced after exposure to temperatures of more than about 1000° F. It has also been suggested to increase the sensible heat available for heating the catalyst by passing the dry preheating gases in contact with the catalyst mass at velocities substantially higher than the gas velocity normally employed in the conversion process. However, the excessive pressure drop and resulting increased cost of circulating the dry gases incident to the higher velocities makes the use of this latter measure undesirable.

It is, therefore, an object of this invention to provide, in the method of preparing hydrogen and carbon dioxide by the catalytic reaction of carbon monoxide and water vapor, an improvement in the step of initially heating the catalyst before passing gases containing carbon monoxide and water vapor in contact with the catalyst.

Another object is the provision of an improved method of preparing hydrogen and carbon dioxide by passing a mixture of gases containing carbon monoxide and water vapor over a catalyst at elevated temperatures, which includes the step of initially raising the temperature of the catalyst by passing steam in contact with the catalyst.

A further object is the provision, for use in the production of hydrogen and carbon dioxide by the catalytic reaction or conversion of carbon monoxide and water, of a catalyst compact capable of being heated from ordinary temperatures to temperatures above the condensation temperature of water vapor under conditions of pressure prevailing in the system by passing steam in contact with the catalyst, without impairment of the physical or catalytic properties of the catalyst.

A still further object is to provide a catalyst compact of the iron oxide-chromium oxide type capable of retaining its physical and catalytic properties in the presence of moisture such as results, for example, from the condensation of steam on the surface of the catalyst compact.

Briefly, the catalysts of our invention are produced by compressing or compacting as, for example, by tabletting, under carefully controlled conditions, an intimate mixture of substances substantially free of water soluble material and consisting essentially of iron oxide, chromium oxide, a lubricant, and water.

We have discovered that when catalyst mixtures of the following composition are prepared and compressed in the manner hereinafter described, catalyst compacts capable of withstanding contact with moisture without impairment of physical or catalytic properties and having excellent mechanical strength are obtained:

|  | Per cent by weight |
|---|---|
| Chromium oxide (calculated as $Cr_2O_3$) | 1–15 |
| Water | 21–28 |
| Lubricant | 0.5–2.0 |
| Iron oxide (calculated as $Fe_2O_3$) | Balance |

As indicated above the catalyst compacts of our invention may contain from 1% to 15% chromium oxide. However, we have found that a chromium content of about 8% affords catalyst compacts having the optimum desired properties, particularly from the standpoint of conversion efficiency when employed in the production of hydrogen and carbon dioxide by the catalytic reaction between carbon monoxide and water vapor.

In the preparation of the catalyst, an intimate mixture of chromium oxide and iron oxide is first granulated by any of the methods well known in the art such as, for example, by passing the mixture through a screen of suitable mesh size (e. g., 6 to 10 mesh). Water in amounts corresponding to approximately 13% of the catalyst mixture prior to the compression step is present in the original mixture of oxides in combination therewith, presumably in the form of the metal hydroxides or hydrated oxides. The original mixture of oxides may contain additional free water in amounts sufficient to bring the total amount of water in the ultimate catalyst mixture up to the total desired 21% to 28%. However, the additional water is not essential in the step of originally granulating the mixture of oxides and may be added subsequently in the preparation of the catalyst mixture as will be pointed out in the following description of our invention. It is important that the original mixture of oxides be essentially free of water soluble materials and that no water soluble materials be subsequently added in the preparation of the catalysts of this invention in order to obtain catalyst compacts having the desired resistance to moisture.

In order to facilitate the hereinafter described compacting or tabletting operation, a small amount of water insoluble lubricant is added to, and thoroughly mixed with the granulated mixture of oxides. The quantity of lubricant added depends to a large extent on the properties and effectiveness of the particular lubricant. However, in general, we have found that from about 0.5% to about 2% of lubricant is desirable. Illustrative of materials which are capable of being uniformly distributed throughout the granulated oxides and which are effective as lubricants in the subsequent compacting or tabletting of the catalyst mixture are graphite, talc, colloidal clays, hydrocarbon oils and waxes, higher molecular weight fatty acids (e. g., stearic, palmitic, and oleic), esters of higher molecular weight fatty acids such as, for example, the mono- and tri-glycerides of such acids, and insoluble salts of higher molecular weight fatty acids such as, for example, the zinc and calcium salts.

In addition to the lubricant, additional water may be added to the mixture to facilitate the compacting of the catalyst mixture and to provide a catalyst compact having the desired mechanical strength. However, if the original mixture of oxides contains sufficient free water, the addition of more water at this point is unnecessary. We have discovered that certain amounts of free water, in addition to the water chemically combined with the oxides, must be present in the granulated mixture prior to the tabletting step to afford catalyst compact having the desired optimum mechanical strength. The amount of free water may be as low as about 8% but should not be greater than about 15%. If the amount of free water in the mixture exceeds 15%, catalyst compacts prepared from the mixture tend to be fragile or lacking in the necessary properties to resist handling and storage, and tend to disintegrate and impede the flow of gases during use. In general, catalyst compacts of optimum mechanical strength and catalytic efficiencies are obtained with mixtures containing from about 10% to 13% of free or uncombined water.

The lubricant and any additional water which might be added are thoroughly distributed throughout the granulated mixture of oxides by any suitable means well known to those skilled in the art such as, for example, by ball milling, tumbling, or by pan mixing. In order to facilitate handling during the tabletting operation hereinafter described, and to obtain a catalyst compact of the desired mechanical strength and resistance to moisture, the mixture should be free flowing, and preferably a substantial proportion should be in granulated form after the lubricant and any additional water have been thoroughly incorporated with the oxides.

The above described mixture of oxides, lubricant, and water is next compressed into the form of a catalyst compact by any method well known in the art as, for example, by means of an automatic tabletting machine. Various pressures may be employed in compressing the material. However, we have found that in order to obtain the optimum mechanical strength and resistance to moisture desired in our finished catalyst compact, the material should be tabletted or compressed under pressures of at least about 35,000 pounds per square inch. We prefer to employ pressures of between 35,000 and 50,000 pounds per square inch in this operation. If pressures of less than about 35,000 pounds per square inch are employed, the resulting compact is noticeably weaker mechanically, presumably because of the retention of excessive amounts of air and resulting poor autogenous bond between the particles. Pressures of greater than about 50,000 pounds per square inch are unnecessary although not objectionable if care is taken to maintain the composition of the catalyst mixture within the limits set forth above.

The catalyst compact prepared as described above may be in the form of pellets of various sizes and shapes depending upon the conditions under which it is to be employed. By way of illustration, for use in our method of preparing hydrogen and carbon dioxide by the catalytic conversion of carbon monoxide and water vapor, we prefer catalyst pellets in the form of solid cylinders of approximately ⅜ inch diameter and having convex end surfaces.

In producing catalyst compact of high mechanical strength it is important that as much air as possible be forced from the granulated catalyst mixture during the compression, or tabletting, operation. We have found that if catalyst compact prepared as described above is granulated and again compressed in a tabletting machine, the resulting pellets are of even higher strength than those resulting from the initial tabletting operation. This increase in strength is apparently attributable to the fact that the granular mixture employed in the second tabletting operation contains less air than was present in the original granular catalyst mixture. If a second compression operation is employed, it may be found economical to compress the catalyst mixture into shapes of larger than the ultimately desired shape during the first compression or tabletting operation.

A catalyst compact prepared as described below was found to be particularly effective for use in the production of hydrogen and carbon dioxide, and withstood our improved conversion method involving the step of initially heating the catalyst mass with steam to the desired conversion temperature without impairment of the physical or catalytic properties of the catalyst compact.

One hundred fifty (150) pounds of lump material containing approximately 8% by weight of chromium oxide and the balance iron oxide and combined water, were granulated through an 8-mesh screen. The granulated mixture of oxides was then transferred to a mechanical mixer of the pan type in which the mixing was accomplished by means of a muller wheel rolling over the granulated material. Two (2) pounds of powdered graphite were added and thoroughly mixed with the granulated oxide mixture. This operation required about 20 minutes. Twenty (20) pounds of water were then added over a period of about 5 minutes without stopping the mixer. After all of the water had been added, mixing was continued for about 20 minutes before removing the mixture from the mixer. Care was taken during the mixing operation to avoid excessive pulverizing of the material.

After the granulated catalyst mixture was removed from the mixer it was compressed in an automatic tabletting machine at a pressure of about 45,000 pounds per square inch. The compact resulting from this compression operation was in the form of cylindrical pellets about ¾ inch in diameter and 1 inch high. These pellets were than granulated through an 8-mesh screen and compressed in an automatic tabletting machine at a pressure of about 45,000 pounds per square inch. In this second compression step, catalyst pellets ⅜ inch in diameter and ⅜ inch high were produced. The ends of the pellets were convex.

In order to determine the effectiveness of the above catalyst compact and method of initially heating the catalyst in applications requiring frequent interruption in the conversion process, a mass of catalyst pellets prepared as specifically described above was employed in the production of hydrogen and carbon dioxide for a period of 108 days. During this period the process was interrupted and again started up 17 times. Each time the process was started, the catalyst mass was initially heated by means of steam. Comparison of the pressure drops over the catalyst mass and conversion efficiencies during the conversion step at the beginning and end of this period of operation indicated no observable differences. The physical and catalytic properties of the catalyst apparently remained substantially unaffected by the repeated contact with moisture incident to preheating the catalyst with steam. Inspection of the catalyst pellets at the end of the period indicated no observable disintegration or change in mechanical strength.

Because of the ability of the catalyst compact of our invention to withstand frequent and prolonged contact with moisture without impairment of the physical and catalytic properties of the compact, the temperature of a mass or bed of the compact can be rapidly raised from ordinary temperatures to any desired elevated temperature by passing steam through the mass without regard to the condensate or moisture produced in the mass. In taking advantage of this property of our catalyst, we have found that the preheating of catalyst masses employed in the catalytic conversion of carbon monoxide and water vapor into hydrogen and carbon dioxide can be accomplished in less time and with far greater economy by passing steam through the catalyst mass than heretofore has been possible by preheating the catalyst by circulating hot, dry inert gases through the mass.

In preheating the catalyst mass in accordance with our invention, steam is admitted to the conversion chamber, containing the catalyst mass, from an available steam line. Steam of any pressure or any desired degree of superheat may be employed, although it is preferable that the temperature of the steam be sufficiently high to heat the catalyst mass substantially to the temperature desired for carrying out the conversion of carbon monoxide (e. g., 650° F.-1000° F.). If steam of sufficiently high temperature is not available, steam of lower temperature may be preheated to the desired temperature before being admitted to contact with the catalyst mass. At the beginning of this initial heating step, the temperature of the catalyst compact is below the maximum temperature at which the steam condenses at the pressure in the catalyst mass and appreciable quantities of moisture accumulate on the surfaces of the catalyst compact. This moisture preferably is drained from the catalyst mass to avoid the accumulation of excessive quantities of water. Those skilled in the art readily will appreciate that because of the available latent heat in the steam, preheating of the catalyst mass with steam is accomplished much more rapidly than by the use of dry gases as has heretofore been the practice. This is particularly true at the beginning of the initial heating step, during condensation of the steam on the catalyst compact.

The rate of heating of the catalyst may be increased as much as desired by the simple expedient of increasing the velocity, or quantity, of steam passed in contact with the catalyst. It is realized, of course, that the velocity of the steam must not be increased to the point where mechanical disturbance and damage to the catalyst mass might result. Those skilled in the art will appreciate that very little additional cost is involved in overcoming the pressure drop over the catalyst mass incident to higher rates of flow of steam obtained from a high pressure source. On the other hand, as has previously been pointed out, the increased pumping costs involved in overcoming this pressure drop where heated, dry, inert gases are employed, in accordance with the methods of the prior art, make undesirable the use of such gases at higher velocities.

The length of time required to bring the catalyst mass up to the desired temperature may vary widely depending for example, on the type of conversion chamber employed and the arrangement of the catalyst mass within the chamber. After the catalyst mass has been brought up to the desired reaction temperature, the heating steam passed in contact with the catalyst is reduced at any desired rate, and a reaction gas mixture containing carbon monoxide and water vapor is started through the catalyst mass. The conversion of carbon monoxide and water vapor into hydrogen and carbon dioxide then proceeds in the manner well known to those skilled in the art.

Although the practice in the art has been to initially heat the catalyst by passing heated, dry, inert gases through the catalyst mass for the specific purpose of avoiding the condensation of moisture on the catalyst, we have found that, by employing the particular catalyst compacts described herein, we are able to carry out the initial heating step by passing steam in contact with the catalyst without regard to the resulting condensation of moisture on the catalyst. Furthermore, there is no indication of impairment of the physical or catalytic properties of the catalyst as is evidenced by the constant pressure drop over the catalyst and the constant conversion efficiency determined from analyses of the reaction and product gases.

The present invention is generally applicable to the production of hydrogen and carbon dioxide by passing a mixture of gases containing carbon monoxide and water vapor in contact with a catalyst at elevated temperatures. In addition to the carbon monoxide and water vapor, various amounts of other gases may be present in the initial mixture of gases such as, for example, nitrogen, oxygen, carbon dioxide, and hydrogen, depending on the source of the gas mixture. Gases which may be subjected to the conversion method to which this invention relates may be obtained, for example, by the well known producer gas method, the water gas method, or by the catalytic reaction of hydrocarbons and water vapor at elevated temperatures.

We claim:

1. An improved catalyst compact obtained by compressing under a pressure of at least 35,000 pounds per square inch an intimate mixture of ingredients consisting essentially of iron oxide, chromium oxide, a small amount of lubricant, and from about 21% to about 28% water of which between about 8% and about 15% is free water, said compact being substantially free of water soluble materials and capable of being heated from ordinary temperatures to elevated temperatures, by passing steam in contact therewith, without impairment of the physical or catalytic properties of the compact.

2. An improved catalyst compact obtained by compressing under a pressure of at least 35,000 pounds per square inch an intimate mixture of ingredients consisting essentially of iron oxide, between 1% and 15% chromium oxide, a small amount of lubricant, and from about 21% to about 28% water of which between about 8% and about 15% is free water, said compact being substantially free of water soluble materials and capable of being heated from ordinary temperatures to elevated temperatures, by passing steam in contact therewith, without impairment of the physical or catalytic properties of the compact.

3. An improved catalyst compact obtained by compressing under a pressure of at least 35,000 pounds per square inch an intimate mixture of in ingredients consisting essentially of iron oxide, from about 1% to about 15% chromium oxide, from about 21% to about 28% water of which between about 8% and about 15% is free water, and from about 0.5% to about 2% of lubricant, said compact being substantially free of water soluble materials and capable of being heated from ordinary temperatures to elevated temperatures, by passing steam in contact therewith, without impairment of the physical or catalytic properties of the compact.

4. An improved catalyst compact obtained by compressing, at pressures of between 35,000 pounds per square inch and 50,000 pounds per square inch, an intimate mixture of ingredients consisting essentially of iron oxide, from about 1% to about 15% chromium oxide, approximately 13% water combined with said oxides, from about 10% to about 13% free water, and from about 0.5% to about 2% graphite, said compact being substantially free of water soluble materials and capable of being heated from ordinary temperatures to temperatures between 650° F. and 1000° F., by passing steam in contact therewith, without impairment of the physical or catalytic properties of said compact.

5. An improved catalyst compact obtained by compressing, at pressures of between 35,000 pounds per square inch and 50,000 pounds per square inch, an intimate mixture of ingredients consisting essentially of iron oxide, about 8% of chromium oxide, approximately 13% water combined with said oxides, from about 10% to about 13% free water, and from about 0.5% to about 2% graphite, said compact being substantially free of water soluble materials and capable of being heated from ordinary temperatures to temperatures between 650° F. and 1000° F., by passing steam in contact therewith, without impairment of the physical or catalytic properties of said compact.

DONALD C. CHRISTAIN.
ROBERT M. REED.

References Cited in the file of this patent

UNITED STATES PATENTS

| Number | Name | Date |
|---|---|---|
| 1,908,484 | Larson | May 9, 1933 |
| 2,106,597 | Ferguson | Jan. 25, 1938 |
| 2,229,199 | Voorhees | Jan. 21, 1941 |
| 2,276,679 | Abbott | Mar. 17, 1942 |
| 2,460,811 | Davies et al. | Feb. 8, 1949 |